United States Patent
Cunning et al.

(10) Patent No.: US 7,973,705 B2
(45) Date of Patent: Jul. 5, 2011

(54) MARINE BUMP MAP DISPLAY

(75) Inventors: Michael D. Cunning, Paola, KS (US); Minchun Liu, Overland Park, KS (US)

(73) Assignee: Garmin Switzerland GmbH (CH)

( * ) Notice: Subject to any disclaimer, the term of this patent is extended or adjusted under 35 U.S.C. 154(b) by 182 days.

(21) Appl. No.: 12/504,814

(22) Filed: Jul. 17, 2009

(65) Prior Publication Data

US 2011/0012773 A1    Jan. 20, 2011

(51) Int. Cl.
*G01S 7/04* (2006.01)
*G01S 7/56* (2006.01)
*G01S 13/86* (2006.01)
*G01S 7/02* (2006.01)
*G01S 7/52* (2006.01)
*G01S 13/00* (2006.01)

(52) U.S. Cl. ........ 342/176; 342/175; 342/179; 342/180; 342/190; 342/191; 342/195; 367/87; 367/99; 367/107; 367/108; 345/418; 345/581; 345/582; 345/584

(58) Field of Classification Search ............. 342/175, 342/176, 179, 195, 22, 23, 27, 28, 52–55, 342/82, 89, 180, 181, 190, 191; 345/418, 345/581, 582, 584, 419–427; 367/87, 93, 367/94, 99, 107, 108; 382/100, 141, 154, 382/181, 190
See application file for complete search history.

(56) References Cited

U.S. PATENT DOCUMENTS

| | | | |
|---|---|---|---|
| 5,900,881 A * | 5/1999 | Ikedo ........................ | 345/426 |
| 5,974,168 A * | 10/1999 | Rushmeier et al. ....... | 382/141 |
| 6,175,368 B1 * | 1/2001 | Aleksic et al. ............ | 345/582 |
| 6,297,833 B1 * | 10/2001 | Ho et al. .................... | 345/582 |
| 6,384,824 B1 * | 5/2002 | Morgan et al. ............ | 345/426 |
| 6,407,744 B1 * | 6/2002 | Van Overveld ............ | 345/584 |
| 6,525,740 B1 * | 2/2003 | Cosman ..................... | 345/584 |
| 6,771,264 B1 * | 8/2004 | Duluk et al. .............. | 345/426 |
| 6,774,906 B2 * | 8/2004 | Lee ............................ | 345/584 |
| 6,819,319 B1 * | 11/2004 | Fenney ....................... | 345/426 |
| 6,825,851 B1 * | 11/2004 | Leather ...................... | 345/584 |
| 6,839,065 B2 * | 1/2005 | Hsu et al. ................... | 345/584 |
| 6,850,244 B2 * | 2/2005 | Munshi et al. ............ | 345/584 |
| 7,205,999 B2 * | 4/2007 | Leather ...................... | 345/584 |
| 7,733,352 B2 * | 6/2010 | Fenney et al. ............. | 345/584 |
| 7,843,463 B1 * | 11/2010 | Kilgard ...................... | 345/584 |
| 2006/0146063 A1 * | 7/2006 | Ohba .......................... | 345/584 |

OTHER PUBLICATIONS

Bump Mapping printed from web.cs.wpi.edu/~matt/courses/cs563/talks/bump/bumpmap,html; published 1995.
Tarini, M. et al.; Real Time, Accurate, Multi-Featured Rendering of Bump Mapped Surfaces; published 2000.
Garmin's GPSMAP 4000/5000 Series Owner's Manual; pp. 33-40; May 2007.
Kautz, Jan et al.; Real-Time Bump Map Synthesis; published 2001.

* cited by examiner

*Primary Examiner* — Bernarr E Gregory
(74) *Attorney, Agent, or Firm* — Samuel M. Korte (57) ABSTRACT

A plotting system and method for plotting radar and/or sonar signals on a bump map, with a simulated height of each data point representing a corresponding signal strength. The plotting system may comprise a processing device for associating particular signal strengths with normal vectors. The normal vectors may be used to determine the simulated heights to be illustrated on the bump map. The plotting system may also comprise a display for graphically displaying the bump map. Furthermore, the processing device may also associate particular signal strengths with particular colors, such that both color and simulated height may illustrate the strength of the plotted signals.

16 Claims, 5 Drawing Sheets

MARINE BUMP MAP DISPLAY

BACKGROUND

Embodiments of the present invention relate to systems configured to display images corresponding with the strength of received radar or sonar signals. In navigation systems, radar and sonar are commonly used to determine the location of objects such as fish, land, other boats, etc. Additionally, radar may be used to track weather and determine the location and density of various storm systems. Data obtained by radar and sonar is commonly presented on a display for viewing by users.

SUMMARY

Embodiments of the present invention relate to a plotting system for plotting radar or sonar data via a bump map, and may comprise a processing device and a display for graphically displaying the bump map. In some embodiments, the plotting system may be operable for displaying a marine bump map including a plurality of pixels. The plotting system may comprise a display, a memory operable to store data corresponding to at least one of a radar signal and a sonar signal, and a processing device coupled with the display and memory. The processing device may be configured for determining at least one of a radar signal intensity and a sonar signal intensity corresponding to one or more of the pixels using the data stored within the memory; determining a normal vector for a first one of the pixels, the normal vector being determined based on a signal intensity of the first pixel and signal intensities of one or more adjacent pixels; determining a brightness value for the first pixel based on the normal vector and a light direction vector; and commanding the display to present the first pixel as a portion of the bump map utilizing the determined brightness value.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
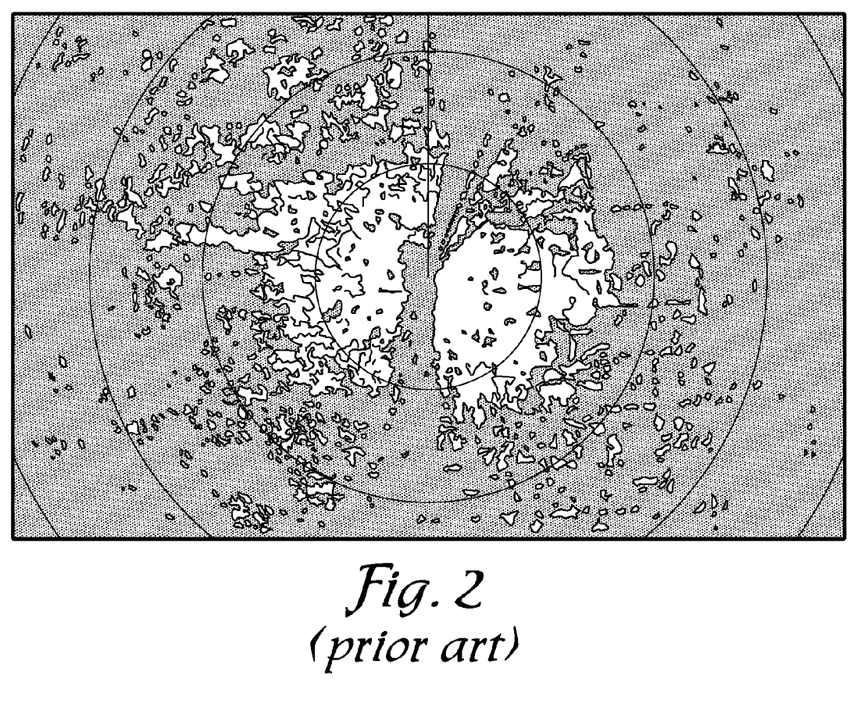
FIG. 2 is a screen shot of a conventional plotting of a radar signal.

In general, embodiments of the present invention relate to plotting received radar and/or sonar signals. Plotting of radar or sonar signals may include plotting a point representing a location of a sensed object relative to a remote sensing device. An example of a typical plotted radar signal is shown in FIG. 2. Additionally, a signal strength corresponding to the location may be denoted by a particular color assigned to the plotted point. However, when plotted radar or sonar signals are presented on a display, differences in color are not always easily recognized and may be difficult to detect in certain lighting situations.

The applicant has discovered that displaying radar or sonar signals using bump mapping techniques allows for greater visual clarity than merely using varying colors to represent varying signal strengths. Specifically, radar or sonar data may be provided in a bump map on a display such that signal strength is indicated by simulated varying heights of each pixel. "Pixel," as used herein, refers to one or more points that may be jointly presented on a display to represent a feature. The bump map provides the illusion of a three-dimensional map by creating height variations through the use of varying pixel brightness. For additional clarity, signal strength may also be plotted using both brightness and color variations simultaneously.

Figure 1:
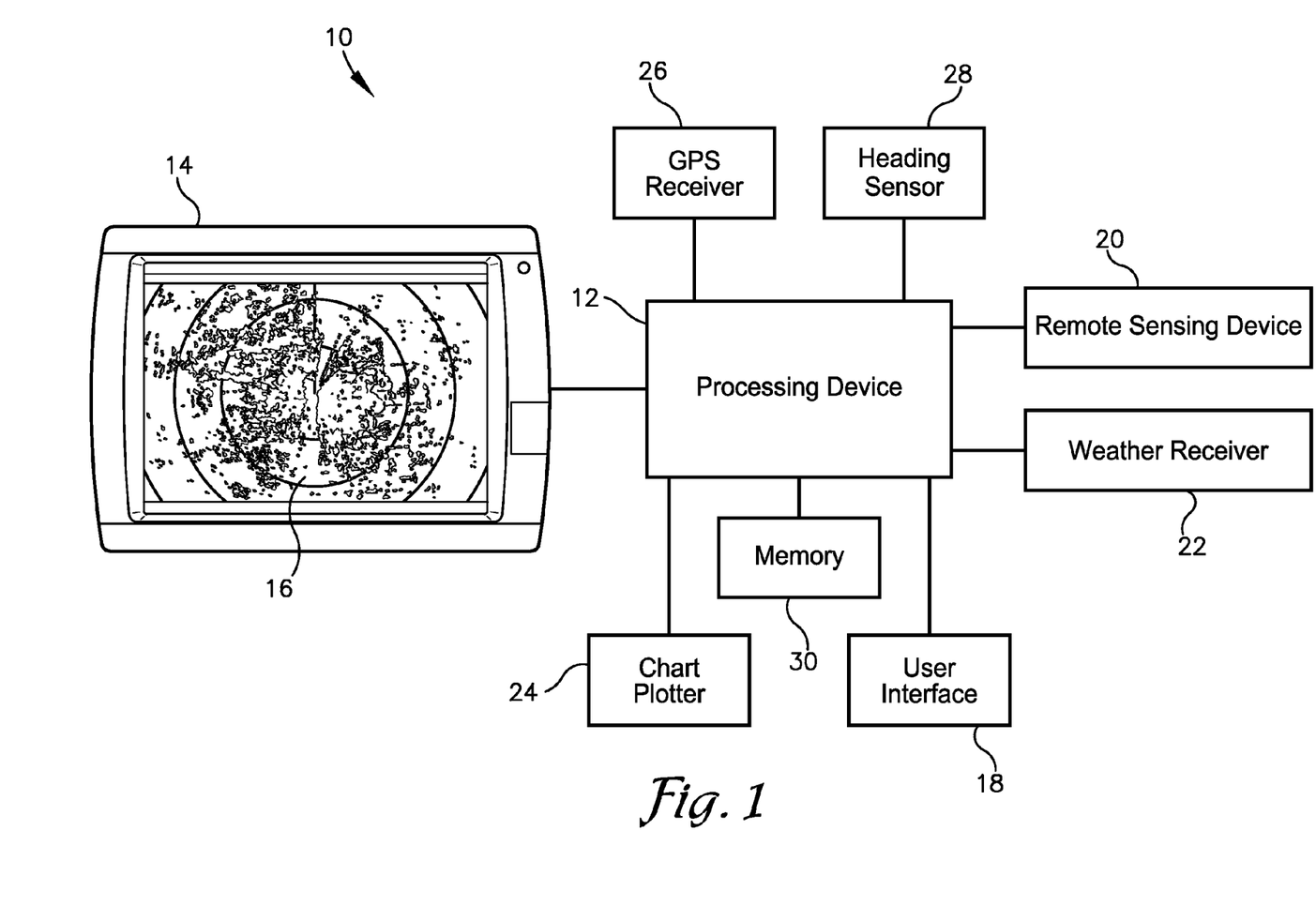
FIG. 1 is a block diagram of a plotting system constructed according to various embodiments of the present invention.

FIG. 1 illustrates a plotting system 10 constructed in accordance with various embodiments of the present invention that may be used to display radar signals and/or sonar signals using bump mapping techniques. The plotting system 10 may comprise a processing device 12 for determining bump map display data and a display 14 for receiving the bump map display data from the processing device 12 and graphically displaying a corresponding bump map 16 comprising a plurality of pixels. Furthermore, the plotting system 10 may comprise, be integrated with, and/or be communicably coupled with any combination of a user interface 18, a remote sensing device 20 such as a radar unit or a sonar unit, a weather receiver 22, a chart plotter 24, a location determining component 26, a heading sensor 28, etc.

The processing device 12 may be configured for receiving radar and/or sonar data and for determining the bump map display data based on the radar or sonar data. The processing device 12 may comprise any number and combination of processors, controllers, integrated circuits, programmable logic devices, or other data and signal processing devices for carrying out the functions described herein, and may additionally comprise a memory 30, transmitters, receivers, and/or communication busses for communicating with the various components of the system 10.

In various embodiments, the processing device 12 may implement a computer program and/or code segments to perform the functions described herein. The computer program may comprise a listing of executable instructions for implementing logical functions in the processing device 12. The computer program can be embodied in any computer readable medium for use by or in connection with an instruction execution system, apparatus, or device, and execute the instructions. In the context of this application, a "computer readable medium" can be any means that can contain, store, communicate, propagate, or transport the program for use by or in connection with the instruction execution system, apparatus, or device. The computer readable medium can be, for example, but not limited to, an electronic, magnetic, optical, electro magnetic, infrared, or semiconductor system, apparatus, device or propagation medium. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM), combinations thereof, and the like.

The memory 30 may be integral with the processing device 12, stand alone memory, or a combination of both. The memory 30 may include, for example, removable and non removable memory elements such as RAM, ROM, flash, magnetic, optical, USB memory devices, and/or other memory elements. The memory 30 may store charts or tables associating particular signal strengths with normal vectors, heights, colors, and/or color intensities, etc., as well as the computer program and code segments mentioned above or other data for instructing the processing device 12 and the display 14 to perform the functions and alterations to the display 14 described herein. Furthermore, the memory 30 may store data corresponding to a direction and/or location of a simulated light source, color and texture maps, and other data relevant to simulating a three-dimensional bump map on the display 14. The memory 30 may also store various data associated with navigation of a marine vehicle (not shown), including user settings, marine route planning data, and navigation data, such as maps, waypoints, ports, cities, states, countries, latitude, longitude, marine vehicle settings, rules and regulations, saved marine routes, etc.

The user interface 18 enables one or more users to share information with the plotting system 10. The user interface 18 may comprise one or more functionable inputs such as buttons, switches, scroll wheels, a touch screen associated with the display 14, voice recognition elements such as a microphone, pointing devices such as mice, touchpads, tracking balls, styluses, a camera such as a digital or film still or video camera, combinations thereof, etc. Further, the user interface 18 may comprise wired or wireless data transfer elements such as a removable memory, data transceivers, etc., to enable the user and other devices or parties to remotely interface with the plotting system 10. The user interface 18 may also include a speaker for providing audible instructions and feedback.

The display 14 may comprise a graphical interface operable to display visual graphics, images, text, etc. in response to external or internal processes and commands. For example, the display 14 may comprise conventional black and white, monochrome, or color display elements including CRT, TFT, LCD, and/or LED display devices. The display 14 may be integrated with the user interface 18, such as in embodiments where the display 14 is a touch screen display to enable the user to interact with it by touching or pointing at display areas to provide information to the plotting system 10. The display 14 may be coupled with the processing device 12 and may be operable to display various information corresponding to the plotting system 10, such as data from the remote sensing device 20, as described below.

The remote sensing device 20 may be any device operable to send and receive radar and/or sonar signals, such as a high-definition radar scanner, a marine radar unit, a sonar unit such as a sonar-capable fish finder, etc. Specifically, radar or sonar signals may be transmitted through water and/or air and reflections or echoes of those signals may be received by the remote sensing device 20. The remote sensing device 20 may be communicably, physically, and/or integrally coupled with one or both of the processing device 12 and the display 14. The remote sensing device 20 may be operable to determine a strength of a reflected signal received, a distance the radar or sonar signal traveled before "bouncing" off of an object or obstacle, and a direction from which the reflected signal is received. The remote sensing device 20 and/or the processing device 12 may calculate the distance based on the amount of time between when the signal is transmitted and when a reflection of the signal is received. The distance and direction may be used by the remote sensing device 20 and/or the processing device 12 to determine a location of an object or a point on the object relative to the remote sensing device.

The weather receiver 22 may be a satellite or XM radio receiver or any other receiver operable to receive radar or sonar data through a transmitted signal other than direct radar or sonar signals. For example, XM radio signals may contain weather data to be transmitted to the marine vehicle, including radar information provided by off-site radar. Therefore, according to one embodiment, a marine vehicle with XM radio capabilities that does not have the remote sensing device 20 may still obtain weather radar information to be provided on the display 14 as the bump map 16 described below. In some embodiments, the weather receiver 22 may include or be operable for coupling with a cellular transceiver for receiving weather information through a cellular network. Such a configuration may be desirable, for example, where a marine craft is not equipped with the remote sensing device 20 or a satellite radio receiver. In various embodiments of the invention, the remote sensing device 20 may be the weather receiver 22.

The chart plotter 24 may be a marine navigation device that integrates GPS data with electronic navigational charts (ENC). The chart plotter 24 may comprise or be integral with any of the processing device 12 and the display 14. Alternatively, the chart plotter 24 may be a stand alone device communicably coupled with the processing device 12 and/or the display 14. The chart plotter 24 may be configured to display the ENC along with a position, heading and speed of the marine vehicle, and may display additional information from radar, sonar, automatic information systems (AIS) or other sensors. The chart plotter 24 may also display data from a connected radar, fish finder, or weather receiver 22, or be coupled to another marine chart plotter or display 14 via a marine network.

The location determining component 26 may be any satellite positioning system device, navigation device, etc. for determining any combination of latitude, longitude, and/or altitude or height above sea level. For example, the location determining component 26 may be any global navigation satellite system (GNSS) receiver, such as a GPS, Galileo, COMPASS, and/or GLONASS receiver. The location determining component 26 may additionally or alternatively use cellular or other transmitted signals instead of, or in addition to, GNSS signals to facilitate determination of geographic locations through triangulation techniques or other position-locating techniques. The location determining component 26 may be operable to generate navigation information such as speed of the location determining component 26 (and/or the marine vehicle), current and previous locations of the location determining component 26, bearing and heading of the location determining component 26, altitude of the location determining component 26, combinations thereof, and the like. Any of the information received or calculated by the location determining component 26 may be used in a variety of ways by the processing device 12 and/or the display 14 to determine or alter information provided on the display 14. For example, geographic locations of objects detected by radar or sonar may be determined based on the geographic location of the location determining component 26.

The heading sensor 28 may be any device for sensing a heading of a moving object, such as the heading of the marine vehicle. The heading sensor 28 may include any combination of the location determining component 26, magnetic sensors, gyroscopic systems, MEMS devices, wind sensors, etc. The location determining component 26 and the heading sensor 28 may be used cooperatively and/or simultaneously. Alternatively, only one of the location determining component 26 and the heading sensor 28 may be attached to or in communication with the plotting system 10.

The above-described plotting system 10 may be used to plot the bump map 16 of radar or sonar data on the display 14, with a simulated height on the bump map 16 corresponding to signal strength. Methods of plotting the bump map 16 may broadly comprise receiving radar and/or sonar data with the processing device 12 and displaying the plotted radar and/or sonar data on the display 14 as the bump map 16. The methods may also comprise associating a signal strength of each plotted point with normal vectors, as described herein, which may then be used to calculate a brightness of each pixel forming the bump map 16 on the display 14, such that the bump map 16 appears to be three-dimensional.

Figure 6:
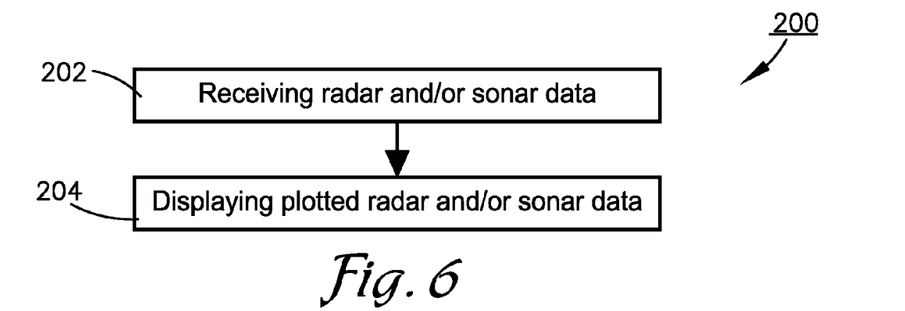
FIG. 6 is a flow chart of an exemplary method of using the plotting system of FIG. 1.
Figure 7:
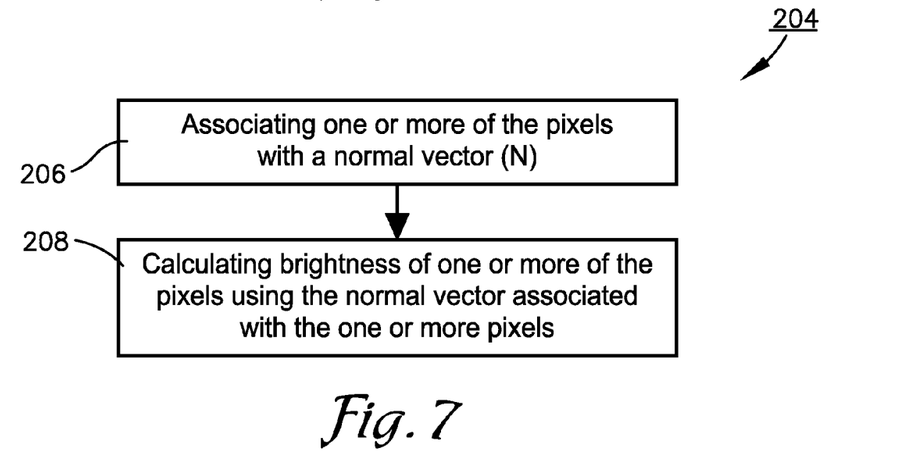
FIG. 7 is a flow chart of one embodiment of a step illustrated in FIG. 6.
Figure 8:
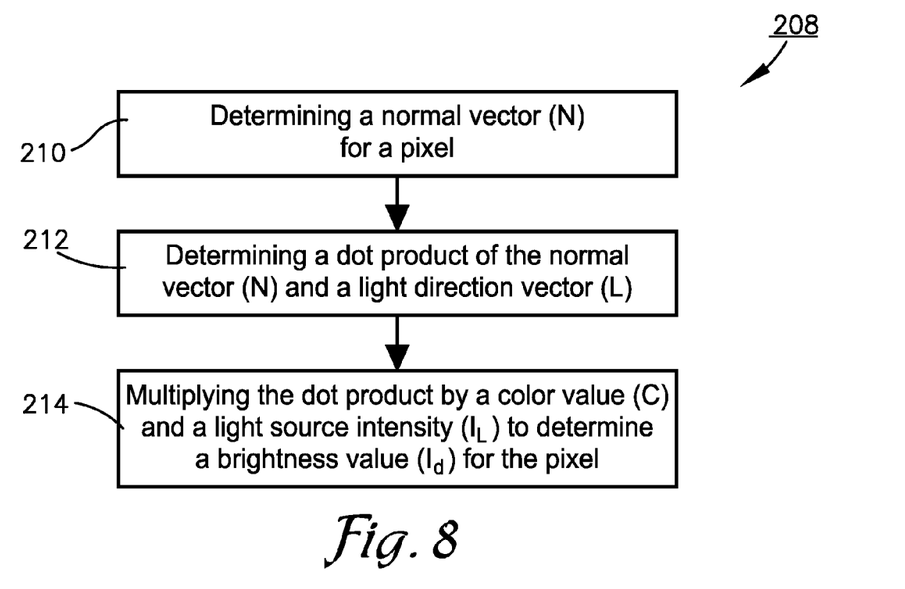
FIG. 8 is a flow chart of one embodiment of a step illustrated in FIG. 7.

The flow charts of FIGS. 6, 7, and 8 depict various steps of exemplary methods of the invention in more detail. In this regard, some of the blocks of the flow charts may represent a module segment or portion of code of the computer programs stored in or accessible by the processing device 12. In some alternative implementations, the functions noted in the various blocks may occur out of the order depicted in FIGS. 6-8. For example, two blocks shown in succession in FIG. 6, 7, or 8 may in fact be executed substantially concurrently, or the blocks may sometimes be executed in the reverse order depending upon the functionality involved.

FIG. 6 illustrates a method 200 in accordance with an exemplary embodiment of the invention. The processing device 12 and/or the chart plotter 24 may receive radar and/or sonar data from at least one of the user interface 18, the remote sensing device 20, the memory 30, and the weather receiver 22, as depicted in step 202. The memory 30 may receive radar and/or sonar data from the user interface 18, the remote sensing device 20, or the weather receiver 22 to be later accessed by the processing device 12 and/or the chart plotter 24. The radar and/or sonar data may comprise location data corresponding to points at which the signal hit or bounced off of an object and signal strength data corresponding to the location data. The location data may be determined as described above based on time between a signal's transmission and reception and based on a direction from which the signal is received. The processing device 12 may then command the display 14 to plot and display pixels corresponding with each of a plurality of location coordinates determined by the radar and/or sonar data, as depicted in step 204.

One embodiment of step 204 is further illustrated in FIG. 7. The signal strength corresponding with each of the location coordinates may be indicated on the display 14 using differences in simulated height of the pixels (e.g., plotted data points) on the bump map 16. For example, each pixel displayed on the display 14 may be associated with a corresponding normal vector (N) having a magnitude corresponding with a maximum difference in signal strength between the pixel and one or more of its adjacent pixels, as depicted in step 206.

In one embodiment of the invention, normal vector (N) associated with a given pixel indicates a vector pointing in the direction of the largest change in signal strength and the length of this vector may indicate the rate of change in that direction. The magnitude of N for a given pixel may be computed by the following calculation:

$$N = \text{Max} \lfloor (I_g - I_{x1,y1}), (I_g - I_{x2,y2}), \ldots \rfloor \tag{1}$$

where $I_g$ is the intensity of the given pixel and $(x1,y1), (x2, y2)$, etc. indicate coordinates of pixels adjacent to the given pixel for which the normal vector (N) is being calculated. For pixels that are not on a border of the bump map 16, there may be eight adjacent pixels. The coordinates of normal vector N point in the direction of the maximum change in signal strength from the current pixel to the adjacent pixels.

The normal vector N may then be used by the processing device 12 and/or the display 14 to calculate an appropriate brightness of various pixels displayed on the screen such that a data point representing the corresponding location coordinates appears to have a particular three-dimensional height representative of signal strength, as depicted in step 208. For example, the processing device 12 may change the brightness of various pixels based on the determined normal vectors.

In one embodiment of step 208 illustrated in FIG. 8, the normal vector (N) may be used for determining the brightness of each pixel using the Lambertian technique. The Lambertian technique may be applied to incoming radar or sonar data using any combination of appropriately configured software and hardware within the processing device 12 described above. However, portions of calculations used in the Lambertian technique may be processed by other components of the plotting system 10 without departing from the scope of the invention.

Figure 9:
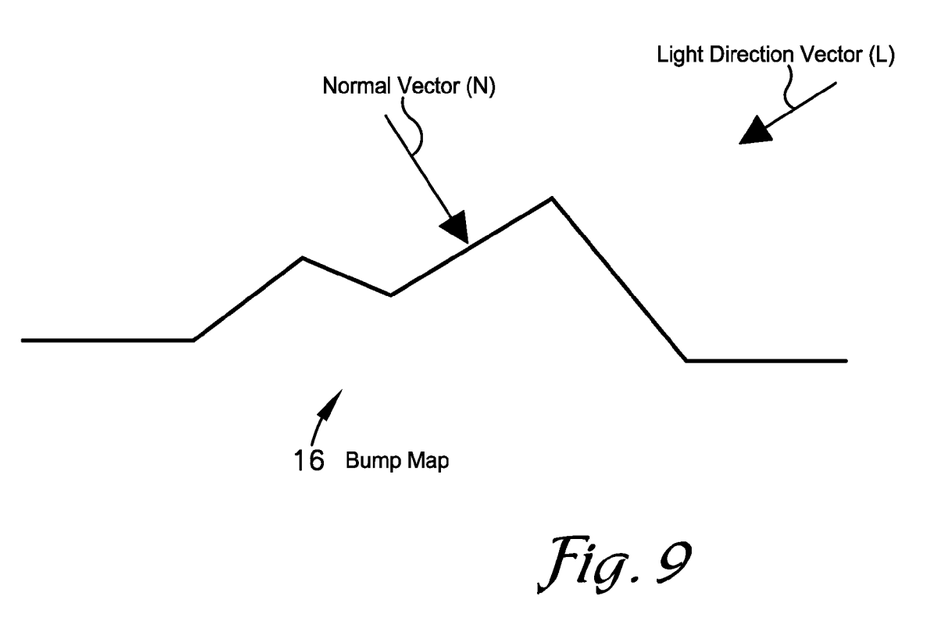
FIG. 9 is a schematic diagram of the bump map, illustrating a normalized normal vector and a light direction vector relative to the bump map.

As illustrated in FIG. 9, the bump map 16 may be formed by determining the normal vector (N) as described above and a light direction vector (L) in order to calculate the brightness of each pixel included in the bump map 16. Thus, the Lambertian technique involves finding the normal vector (N) for one or more of the pixels to be included on the bump map 16, as depicted in step 210.

The Lambertian technique may further include determining a dot product of the normal vector (N) and the light direction vector (L), as depicted in step 212. The light direction vector (L) may be defined as a vector pointing from the surface to a simulated light source. The normalized light direction vector (L) may be determined based on pre-configured, pre-programmed, or user-entered simulated light source location or three-dimensional coordinates. However, neither the simulated light source nor the simulated light source coordinates need to be illustrated by the display 14.

The dot product of the normal vector (N) and the light direction vector (L) may then be multiplied by a color value (C) and an intensity value ($I_L$) associated with the light direction vector to determine pixel brightness (i.e., an intensity of diffusely reflected light) ($I_d$) of the pixel to be displayed on the bump map 16, as depicted in step 214.

Specifically, the Lambertian technique may be illustrated mathematically by equation 2 below:

$$I_d = L \cdot N * C * I_L \qquad (2)$$

where $I_d$ is the brightness for a given pixel, L is the light direction vector, N is the normal vector, C is the color value, and $I_L$ is an intensity corresponding to the light direction vector.

Using the Lambertian technique to process each of the pixels making up the bump map 16 provides the appearance of bumps and depressions based on brightness assigned to various pixels on the surface displayed. The brightness (i.e., the intensity of the diffusely reflected light $I_d$) will be highest if the normal vector (N) points in the same direction as the light direction vector (L), and lowest if the normal vector (N) is perpendicular to the light direction vector (L).

Figure 3:
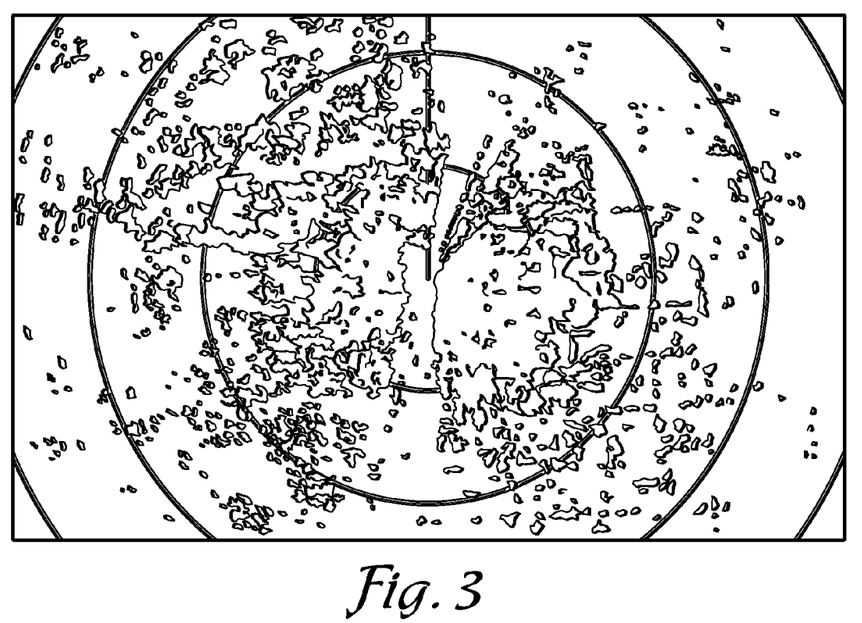
FIG. 3 is a screen shot of an exemplary bump map of the radar signal as displayed by the plotting system shown in FIG. 1.

In some embodiments, a single color may be displayed on the display 14, with pixel brightness alone used to illustrate varying heights and therefore varying signal strengths, as in FIG. 3. However, in other embodiments, the color values (C) may be associated with particular signal strengths, such that both a color and a perceived height may be displayed at each of the pixels to more clearly illustrate various signal strengths. For example, data corresponding to one or more color values may be stored in memory 30 and associated with particular pixels based on the signal strength associated with that pixel. The processing device 12 may use the color values to color one or more pixels displayed on the display 14.

Figure 4:
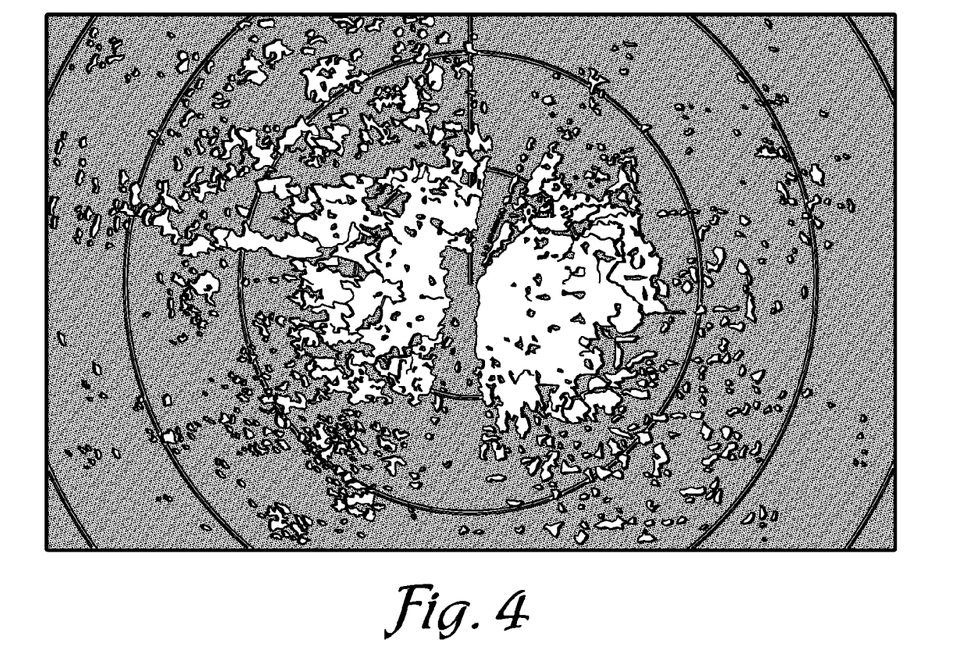
FIG. 4 is a screen shot of the exemplary bump map of the radar signal according to another embodiment of the invention.
Figure 5:
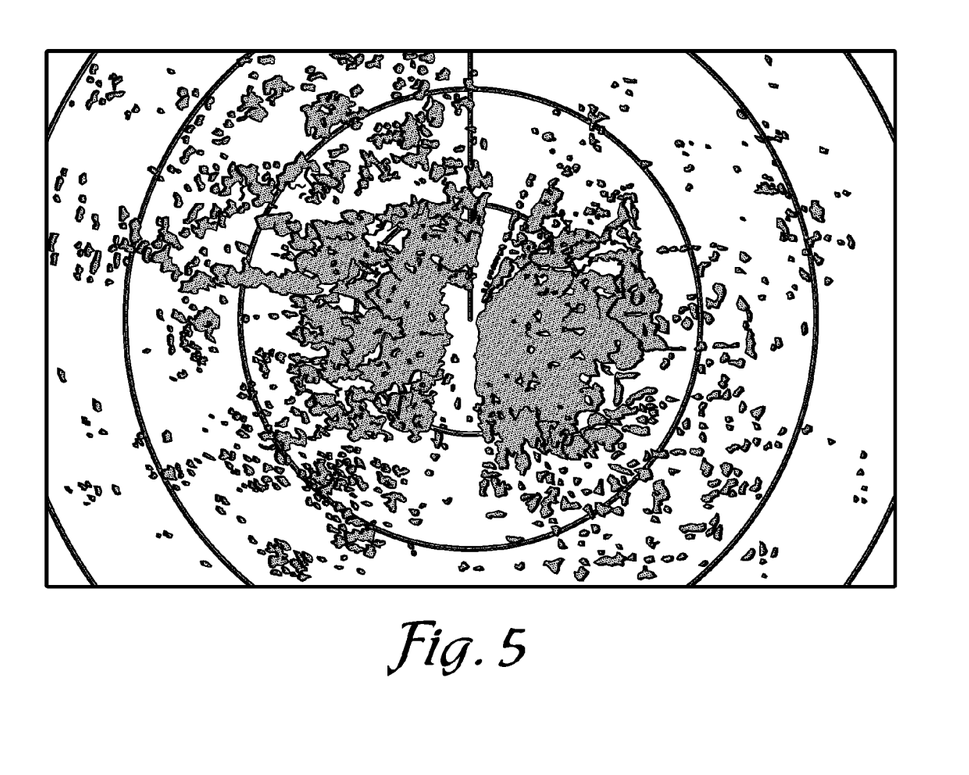
FIG. 5 is a screen shot of the exemplary bump map of the radar signal displayed with a different texture than illustrated in FIG. 4.

Additionally, different textures may be associated with the plotted signals, as illustrated in FIGS. 4 and 5. Different textures may be achieved by, for example, performing calculations using several light sources instead of just one. The image can also be high pass/low pass filtered either pre or post bump map calculation to achieve a different texture. The range of colors used in the bump map can also be utilized to achieve a desirable image texture.

The radar and/or sonar data illustrated on the display 14 may be integrated with and/or overlapped with other visually displayable information, such as navigational data. Additionally, the processing device 12 may also be configured to receive a continual input of radar and sonar data in real time and output a continual output to the display 14, such that the bump map 16 may be substantially continually updated in real time. For example, data stored in the memory 30 may be dynamically updated based on radar and/or sonar signals in order to "refresh" the display 14, such that as the objects sensed by radar and/or sonar move, or as the system 10 itself moves, the bump map 16 is altered accordingly to illustrate the objects on the display 14.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A plotting system for displaying a marine bump map including a plurality of pixels, the system comprising:
   a display;
   a memory operable to store data corresponding to at least one of a radar signal and a sonar signal; and
   a processing device coupled with the display and memory, the processing device configured for:
      determining at least one of a radar signal intensity and a sonar signal intensity corresponding to one or more of the pixels using the data stored within the memory;
      determining a normal vector for a first one of the pixels, the normal vector being determined based on a signal intensity of the first pixel and signal intensities of one or more adjacent pixels;
      determining a brightness value for the first pixel based on the normal vector and a light direction vector; and
      commanding the display to present the first pixel as a portion of the bump map utilizing the determined brightness value.

2. The plotting system of claim 1, further including a marine radar unit operable to transmit and receive radio signals to generate the radar signal associated with the data stored in the memory.

3. The plotting system of claim 2, further including dynamically updating the data stored in the memory based on radar signals generated by the marine radar unit to refresh the display.

4. The plotting system of claim 1, further including a sonar unit operable to generate and detect sound to produce the sonar signal associated with the data stored in the memory.

5. The plotting system of claim 4, further including dynamically updating the data stored in the memory based on sonar signals generated by the sonar unit to refresh the display.

6. The plotting system of claim 1, further including a remote sensing device operable to generate the data associated with at least one of the radar signal and the sonar signal.

7. The plotting system of claim 1, wherein the processing device is further configured to:
   determine a normal vector for each of the pixels within the bump map, wherein the normal vector for each of the pixels is based on the signal intensity of each pixel and the signal intensities of one or more adjacent pixels;
   determine a brightness value for each of the pixels based on the light direction vector and the normal vectors corresponding to each pixel; and
   command the display to present the pixels as the bump map using the determined brightness values.

8. The plotting system of claim 1, wherein the memory further includes data corresponding to a color value and the processing device is operable to color the first pixel using the color value such that the first pixels is presented with a color corresponding to the color value.

9. The plotting system of claim 8, wherein the processor is operable to determine the brightness value by taking a dot product of the normal vector and the light direction vector and multiplying the resulting product by a light source intensity corresponding to the light direction vector.

10. The plotting system of claim 9, wherein the brightness value is determined by: $I_d = L \cdot N * C * I_L$, where $I_d$ is the brightness value, L is the light direction vector, N is the normal vector, C is the color value, and $I_L$ is the light source intensity corresponding to the light direction vector.

11. A method for creating a marine bump map including a plurality of pixels, the method comprising:
   determining at least one of a radar signal intensity and a sonar signal intensity corresponding to one or more of the pixels;
   determining a normal vector for a first one of the pixels, the normal vector for the first pixel being determined based on a signal intensity of the first pixel and signal intensities of one or more adjacent pixels;

determining a brightness value for the first pixel based on the normal vector and a light direction vector; and displaying the pixel on a marine display as a portion of the bump map with a brightness corresponding to the brightness value.

12. The method of claim 11, further including— determining a normal vector for each of the pixels within the bump map, wherein the normal vector for each of the pixels is based on the signal intensity of each pixel and the signal intensities of one or more adjacent pixels;

determining a brightness value for each of the pixels based on the light direction vector and the normal vectors corresponding to each pixel; and displaying the pixels on the marine display as the bump map using the determined brightness values.

13. The method of claim 11, further including coloring the first pixel with a color value such that the first pixel is presented with a color corresponding to the color value.

14. The method of claim 13, wherein determining the brightness value includes taking a dot product of the normal vector and the light direction vector and multiplying the resulting product by a light source intensity corresponding to the light direction vector.

15. The method of claim 14, wherein the brightness value is determined by: $I_d = L \cdot N * C * I_L$, where $I_d$ is the brightness value, L is the light direction vector, N is the normal vector, C is the color value, and $I_L$ is the light source intensity corresponding to the light direction vector.

16. The method of claim 11, wherein the radar signal intensity and/or the sonar signal intensity is determined by receiving at least one of a radar signal and a sonar signal.

* * * * *